United States Patent [19]
Taniguchi et al.

[11] Patent Number: 4,749,264
[45] Date of Patent: Jun. 7, 1988

[54] FRONT CONVERSION LENS SYSTEM

[75] Inventors: Nobuyuki Taniguchi; Yoshiaki Hata, both of Nishinomiya; Takeo Hoda, Kawachinagano; Manabu Inoue, Kobe; Yoshinobu Kudo, Sakai; Hiroshi Ueda, Toyokawa, all of Japan

[73] Assignee: Minolta Camera Kabushiki Kaisha, Osaka, Japan

[21] Appl. No.: 942,290

[22] Filed: Dec. 16, 1986

[30] Foreign Application Priority Data

Dec. 26, 1985 [JP] Japan ................... 60-295843

[51] Int. Cl.$^4$ .................... G02B 15/02; G02B 9/04
[52] U.S. Cl. ............................ 350/422; 350/481
[58] Field of Search .................. 350/422, 481, 453

[56] References Cited

U.S. PATENT DOCUMENTS 2,831,396  4/1958  Klemt ........................ 350/422
3,008,373  11/1961  Lange ........................ 350/422

FOREIGN PATENT DOCUMENTS 46-41340  12/1971  Japan ........................ 350/422
47-8110   3/1972   Japan ........................ 350/422

Primary Examiner—John K. Corbin
Assistant Examiner—Scott J. Sugarman
Attorney, Agent, or Firm—Burns, Doane, Swecker & Mathis

[57] ABSTRACT

The present invention provides a front conversion lens system attachable in front of an objective lens of a camera in which either of a real focal length photographing mode and a pseudo focal length photographing mode in which, an area, in an image recorded in a frame, smaller than a normal printing area printed when selecting the real focal length photographing mode is printed, is selectable, the lens system satisfying the following condition:

$$0.25 (f/DF) (L-L')/L\ 7.0$$

wherein; f represents a focal length of a photographing lens system including the front conversion lens system and the objective lens; DF represents an axial thickness of the front conversion lens system; L represents a length of a diagonal line of an image plane to be printed when the real focal length photographing mode is selected; and L' represents a length of a diagonal line of an image plane to be printed when the pseudo focal length photographing mode is selected.

8 Claims, 3 Drawing Sheets

FNO 2.8

−1.0   1.0

Spherical
Aberration

ω=10.25°

−−−− DM
——— DS

−1.0   1.0

Astigmatism

ω=10.25°

−2.0   2.0

Distortion (%)

FIG.5a

FNo 2.8

-1.0 | 1.0
Spherical Aberration d

-1.0 | 1.0
Astigmatism

-2.0 | 2.0
Distortion (%)

FIG.6a

FNo 2.8 d

-0.5 | 0.5
Spherical Aberration

-0.5 | 0.5
Astigmatism

-2.0 | 2.0
Distortion (%)

FRONT CONVERSION LENS SYSTEM

BACKGROUND OF THE INVENTION

1. Field of the Invention

The present invention relates to a front conversion lens system included in a front converter which is mounted in front of an objective lens for converting a focal length of a photographing optical system from that of only the objective lens.

2. Description of the Prior Art

A camera is proposed, for example in U.S. Pat. No. 4,583,831, in which either a real focal length photographing mode and a pseudo focal length photographing mode is selectable prior to the photographing operation, and a mark, indicating the selected mode, is recorded onto a film with the photographed image at each frame. Such camera is called "trimming camera" hereinafter. When printing each frame of the film photographed by the trimming camera, the printer should discriminate the selected mode based on the mark recorded onto the film with respect to each frame to set its enlarging ratio in accordance with the selected mode.

In such a camera system including the trimming camera and the printer, an area to be reproduced on a print, if photographed in the pseudo focal length photographing mode, is smaller than a normal area of a frame photographed in the real focal length photographing mode. Therefore, if the pseudo focal length photographing mode is selected, such frame is enlarged with a larger ratio than that of the frame photographed in the real focal length photographing mode. Thus a print obtained by the pseudo focal length photographing mode is similar to a print photographed by using an objective lens having a longer focal length than that of the actual objective lens used in the photographing operation. Such apparent focal length is called "pseudo focal length" hereinafter.

Here, in the pseudo focal length photographing mode, the pseudo focal length is extended in accordance with the increase of the enlarging ratio in printing. Namely, the pseudo focal length is lengthened in accordance with the decrease of area in a frame to be reproduced on a print when the pseudo focal length photographing mode is selected.

However, in accordance with the increase of enlarging ratio, particles of a film become conspicuous in a print. Therefore, the pseudo focal length, that is, the enlarging ratio of the printer, is limited.

Here, the upper limit of the pseudo focal length should be limited according to a combination of, brightness condition of a main object to be photographed, exposure condition when photographed, characteristics of film and photographic paper to be used, and so on. However, it should be limited to 3 to 4 times the real focal length of the objective lens when considering the standard condition.

SUMMARY OF THE INVENTION

An object of the present invention is to provide an attachment, used when photographing, which can obtain a print similar to that photographed by using an objective lens having a longer focal length than the pseudo focal length limited in the trimming camera as described above.

Another object of the present invention is to provide a front conversion lens system attachable in front of the objective lens of the trimming camera for extending the apparent focal length over the pseudo focal length limited in the trimming camera as described above.

A further object of the present invention is to provide the above front conversion lens system for extending the apparent focal length over the pseudo focal length limited in the trimming camera as described above without deteriorating the quality of the image reproduced on a print.

The present invention provides a front conversion lens system attachable in front of an objective lens of a camera in which either of a real focal length photographing mode and a pseudo focal length photographing mode in which, an area, in an image recorded in a frame, smaller than a normal printing area printed when selecting the real focal length photographing mode is printed, is selectable, the lens system satisfying the following condition:

$$0.25 < (f/\Sigma DF)\cdot(L-L')/L < 7.0$$

wherein: f represents a focal length of a photographing lens system including the front conversion lens system and the objective lens; $\Sigma DF$ represents an axial thickness of the front conversion lens system; L represents a length of a diagonal line of an image plane to be printed when the real focal length photographing mode is selected; and L' represents a length of a diagonal line of an image plane to be printed when the pseudo focal length photographing mode is selected.

The features of the present invention, which are believed to be novel, are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIGS. 5a to 5c represent graphic plots of aberration curves of the second embodiment with the objective lens; and FIGS. 6a to 6c represent graphic plots of aberration curves of the objective lens only.

DETAILED DESCRIPTION OF THE PREFERRED EMBODIMENTS

Figure 1:
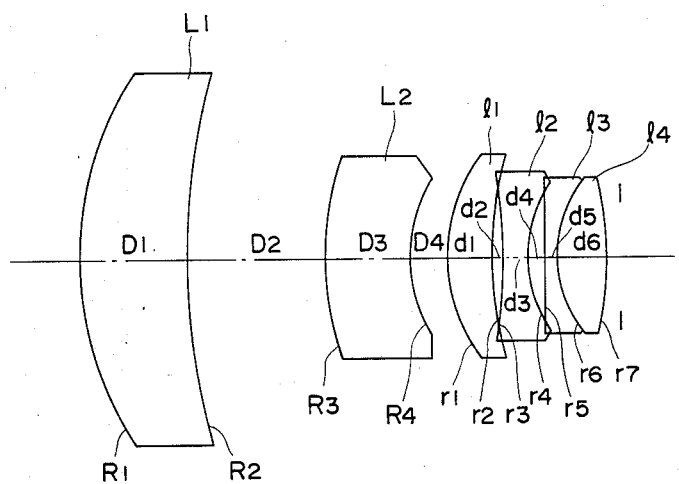
FIG. 1 represents a schematic cross sectional view of the front conversion lens system of the first embodiment according to the present invention attached to an objective lens.

The following specification, taken in conjunction with the drawings, sets forth the preferred embodiments of the present invention. The embodiments of the invention disclosed herein are the best modes contemplated by the inventor for carrying out his invention in the commercial optical field, although it should be understood that various modifications can be accomplished within the parameters of the present invention.

In the trimming camera as described above, if the apparent focal length longer than the pseudo focal length is desired in the condition in which the pseudo focal length is limited, it is effective to attach a front converter including a front conversion lens system in front of the objective lens. The front converter can extend the focal length of the photographing optical system composed of the objective lens and the front converter, in comparison with that of the objective lens only. Therefore, if such front converter is applied, the real focal length of the photographing optical system composed of the objective lens and the front converter becomes longer than that of the objective lens only. Therefore, the pseudo focal length is also extended by applying the front converter in comparison with that of the objective lens only.

Furthermore, such a front conversion lens system for the trimming camera is used only when the pseudo focal length photographing mode is selected. Thus, since such a front conversion lens system is not necessary to cover the whole angle of view of the objective lens, the correction of aberrations would be easy in comparison with the conventional front conversion lens system attached to the normal objective lens. On the other hand, the magnification of the front conversion lens system can be increased with keeping the correction of aberrations similar to that of the conventional front conversion lens system. Additionally, since a number of lens elements is not necessary for correcting aberrations in such a front conversion lens system for trimming camera, compactness of the front conversion lens system can be improved and the front conversion lens system can be more simple in construction.

In the conventional front conversion lens system, aberrations of high degrees would be liable to be produced in accordance with the increase of the angle of view. The reason is that the photographing light rays, which will reach the area to be printed, pass through higher position ( larger height from the optical axis ) as increasing the angle of view, especially the object side. On the other hand, in the front conversion lens system for the trimming camera according to the present invention, it is only required to cover the smaller angle of view corresponding to an area printed onto the photographic paper when the pseudo focal length photographing mode is selected.

Therefore, the angle of view to which the the front conversion lens system for the trimming camera must cover becomes smaller than that of the conventional front conversion lens system. Namely, in the front conversion lens system according to the present invention, since the height through which the photographing light rays pass can be decreased, aberrations of high degrees would be corrected in comparison with that in the conventional front conversion lens system. Additionally, the decrease of height through which the photographing light rays pass causes a decrease in the diameter of the lens elements, especially at the object side, resulting the improvement of the compactness of the lens system.

Furthermore, negative deviation of the image plane is liable to be increased in accordance with the increase of angle of view or with the increase of magnification of the front conversion lens system in the conventional front conversion lens system. However, according to the front conversion lens system of the present invention, since the angle of view to which the front conversion lens system must cover is decreased, aberration correcting performance of the front conversion lens system would be improved apparently, or magnification of the front conversion lens system can be increased, keeping the aberration correcting performance similar to that of the conventional front conversion lens system.

Figure 2:
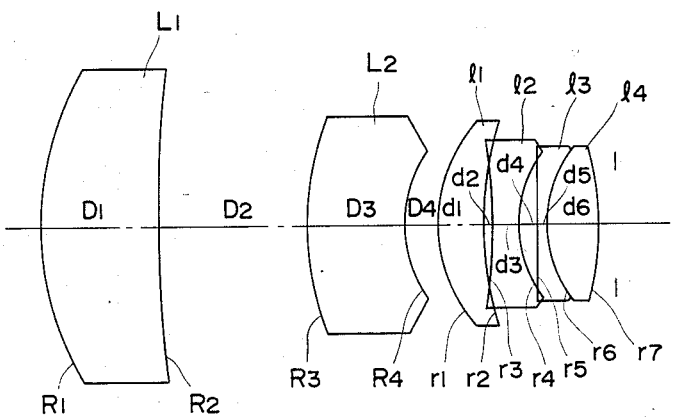
FIG. 2 represents a schematic cross sectional view of the front conversion lens system of the second embodiment according to the present invention attached to the objective lens.
Figure 3:
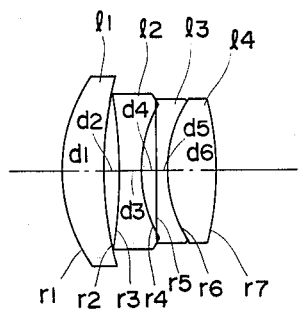
FIG. 3 represents a schematic cross sectional view of the objective lens.
Figure 4A:
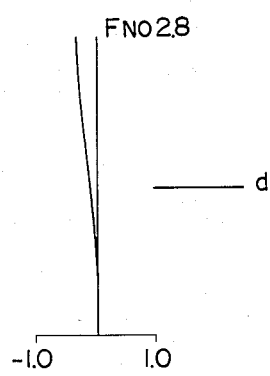
FIGS. 4a to 4c represent graphic plots of aberration curves of the first embodiment with the objective lens.
Figure 4B:
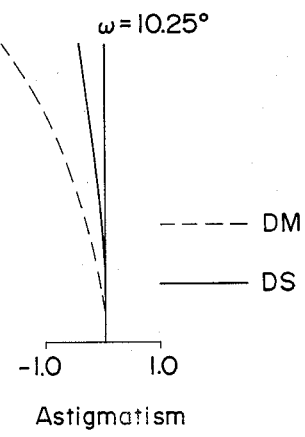
Figure 4C:
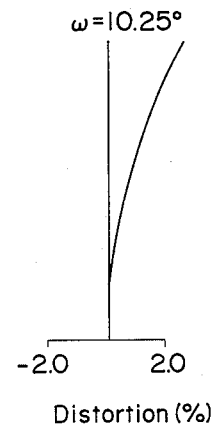

Based on the above described consideration, as shown in FIGS. 1 and 2, the present invention provides a front conversion lens system FC attachable in front of an objective lens OL of a camera in which either of a real focal length photographing mode and a pseudo focal length photographing mode in which, an area, in an image recorded in a frame, smaller than a normal printing area printed when selecting the real focal length photographing mode is printed, is selectable, the lens system FC satisfying the following condition :

$$0.25 < (f/\Sigma DF) \cdot (L-L')/L < 7.0 \tag{1}$$

wherein: f represents a focal length of a photographing lens system including the front conversion lens system FC and the objective lens OL; $\Sigma DF$ represents an axial thickness of the front conversion lens system FC; L represents a length of a diagonal line of an image plane to be printed when the real focal length photographing mode is selected ; and L' represents a length of a diagonal line of an image plane to be printed when the pseudo focal length photographing mode is selected.

Detailed explanation with respect to the condition (1) will be described below. A parameter $(L-L')/L$ in condition (1) is related to a "trimming ratio" calculated by dividing, the difference between the real focal length of the objective lens and the pseudo focal length thereof, by the former. And it increases in accordance with the increase of the enlarging ratio used for printing the frame photographed in the pseudo focal length photographing mode. On the other hand, the other parameter $f/\Sigma DF$ in condition (1) defines a reciprocal number of the axial thickness of the front conversion lens system FC. Here it is possible to decrease the axial thickness $\Sigma DF$ of the front conversion lens system FC according to the increase of the trimming ratio $(L-L')/L$ . If the lower limit of condition (1) is violated, since the trimming ratio $(L-L')/L$ becomes too small while the axial thickness of the front conversion lens system FC is too large, it is difficult to achieve the object of the present invention. On the other hand, if the upper limit of condition (1) is violated, it becomes difficult to manufacture the front conversion lens system by mechanical processing and particles of the film become conspicuous in the print because of the increase of the enlarging ratio in printing.

The following Table 1 shows an objective lens to which the front conversion lens system according to the present invention is attachable. In the Table, radii of curvature, $r_1, r_2, \ldots$; axial distances, $d_1, d_2, \ldots$; refractive indices for light of d-line, $nd_1, nd_2, \ldots$; and Abbe numbers for light of d-line, $\nu_1, \nu_2, \ldots$; are numbered from the object side.

The following Tables 2 and 3 show front conversion lens systems of the first and second embodiments according to the present invention with the objective lens shown in the Table 1, respectively. In the Tables, radii of curvature, $R_1, R_2, \ldots$; axial distances, $D_1, D_2, \ldots$; refractive indices for light of d-line, $Nd_1, Nd_2$; and Abbe numbers for light of d-line, $\nu d_1, \nu d_2$; are numbered from the object side.

In the first and second embodiments, the front conversion lens system FC comprises, from the object side, a first positive meniscus lens element $L_1$ convex to the object side, and a second negative meniscus lens element $L_2$ convex to the object side. On the other hand, the objective lens OL comprises, from the object side, a first positive meniscus lens element $l_1$ convex to the object side, a second bi concave lens element $l_2$, a third negative lens element $l_3$, and a fourth bi-convex lens element $l_4$ cemented to the third lens element $l_3$.

In the first embodiment as shown in Table 2 and FIG. 1, the front conversion lens system FC is attacheable in front of the objective lens OL having a focal length of 35 mm and an aperture ratio of F/2.8. The pseudo focal length of the objective lens OL is set to 70 mm by selecting the pseudo focal length photographing mode. When the front conversion lens system FC of the first embodiment is attached to the objective lens OL, the apparent focal length of the photographing optical system composed of the front conversion lens system FC and the objective lens OL is converted to 120 mm with maintaining the aperture ratio of F/2.8, if the pseudo focal length photographing mode is selected. Therefore, when photographing an object using the front conversion lens system FC of the first embodiment in the pseudo focal length photographing mode, a print similar to that photographed using an objective lens having a focal length of 120 mm can be obtained. Thus, since the apparent focal length of the photographing optical system is converted from 70 mm to 120 mm by applying the front conversion lens system FC, a magnification ratio in focal length of the front conversion lens system FC is represented by 120/70, that is, about 1.7.

On the other hand, in the second embodiment as shown in Table 3 and FIG. 2, the pseudo focal length of the objective lens OL is set to 140 mm. When the front conversion lens system FC of the second embodiment is attached to the objective lens OL, the apparent focal length of the photographing optical system composed of the front conversion lens system FC and the objective lens OL is converted to 280 mm maintaining the aperture ratio of F/2.8, if the pseudo focal length photographing mode is selected. Therefore, when photographing an object using the front conversion lens system FC of the second embodiment in the pseudo focal length photographing mode, a print similar to that photographed using an objective lens having a focal length of 280 mm can be obtained. Thus, since the apparent focal length of the photographing optical system is converted from 140 mm to 280 mm by applying the front conversion lens system FC, a magnification ratio in focal length of the front conversion lens system FC is represented by 280/140, that is, about 2.0.

In the Tables, f represents a focal length of the objective lens, f* represents an apparent focal length of the photographing system composed of the objective lens and the front conversion lens system in the pseudo focal length photographing mode, $F_{NO}$ represents an F-number, $2\omega$ represents the angle of view.

TABLE 1

Objective Lens
$f = 35.0$   $F_{NO} = 2.8$   $2\omega = 63.4°$

|  | Radius of curvature | Axial distance | Refractive index | Abbe number |
|---|---|---|---|---|
| ($l_1$) | $r_1$ 12.751 | $d_1$ 3.826 | $nd_1$ 1.78850 | $\nu_1$ 45.7 |
|  | $r_2$ 34.311 | $d_2$ 0.900 |  |  |
| ($l_2$) | $r_3$ −58.870 | $d_3$ 2.247 | $nd_2$ 1.67270 | $\nu_2$ 32.2 |
|  | $r_4$ 11.206 | $d_4$ 1.078 |  |  |
| ($l_3$) | $r_5$ 56.300 | $d_5$ 1.061 | $nd_3$ 1.65446 | $\nu_3$ 33.7 |
| ($l_4$) | $r_6$ 10.264 | $d_6$ 4.162 | $nd_4$ 1.80500 | $\nu_4$ 41.0 |
|  | $r_7$ −28.811 |  |  |  |

TABLE 2

Embodiment 1
(Front Conversion Lens System) + (Objective Lens)
$f^* = 120.0$   $F_{NO} = 2.8$   $2\omega = 20.5°$

|  | Radius of curvature | Axial distance | Refractive index | Abbe number |
|---|---|---|---|---|
| ($L_1$) | $R_1$ 25.836 | $D_1$ 9.144 | $Nd_1$ 1.51680 | $vd_1$ 64.2 |
|  | $R_2$ 63.217 | $D_2$ 11.886 |  |  |
| ($L_2$) | $R_3$ 26.231 | $D_3$ 7.354 | $Nd_2$ 1.75690 | $vd_2$ 31.8 |
|  | $R_4$ 13.117 | $D_4$ 3.000 |  |  |
| ($l_1$) | $r_1$ 12.751 | $d_1$ 3.826 | $nd_1$ 1.78850 | $\nu_1$ 45.7 |
|  | $r_2$ 34.311 | $d_2$ 0.900 |  |  |
| ($l_2$) | $r_3$ −58.870 | $d_3$ 2.247 | $nd_2$ 1.67270 | $\nu_2$ 32.2 |
|  | $r_4$ 11.206 | $d_4$ 1.078 |  |  |
| ($l_3$) | $r_5$ 56.300 | $d_5$ 1.061 | $nd_3$ 1.65446 | $\nu_3$ 33.7 |
| ($l_4$) | $r_6$ 10.264 | $d_6$ 4.162 | $nd_4$ 1.80500 | $\nu_4$ 41.0 |
|  | $r_7$ −28.811 |  |  |  |

$(f/\Sigma DF) \cdot (L - L')/L = 1.10$

TABLE 3

Embodiment 2
(Front Conversion Lens System) + (Objective Lens)
$f^* = 280.0$   $F_{NO} = 2.8$   $2\omega = 8.8°$

|  | Radius of curvature | Axial distance | Refractive index | Abbe number |
|---|---|---|---|---|
| ($L_1$) | $R_1$ 26.119 | $D_1$ 9.757 | $Nd_1$ 1.51680 | $vd_1$ 64.2 |
|  | $R_2$ 109.689 | $D_2$ 12.572 |  |  |
| ($L_2$) | $R_3$ 24.001 | $D_3$ 8.254 | $Nd_2$ 1.75520 | $vd_2$ 27.5 |
|  | $R_4$ 10.264 | $D_4$ 3.000 |  |  |
| ($l_1$) | $r_1$ 12.751 | $d_1$ 3.826 | $nd_1$ 1.78850 | $\nu_1$ 45.7 |
|  | $r_2$ 34.311 | $d_2$ 0.900 |  |  |
| ($l_2$) | $r_3$ −58.870 | $d_3$ 2.247 | $nd_2$ 1.67270 | $\nu_2$ 32.2 |
|  | $r_4$ 11.206 | $d_4$ 1.078 |  |  |
| ($l_3$) | $r_5$ 56.300 | $d_5$ 1.061 | $nd_3$ 1.65446 | $\nu_3$ 33.7 |
| ($l_4$) | $r_6$ 10.264 | $d_6$ 4.162 | $nd_4$ 1.80500 | $\nu_4$ 41.0 |
|  | $r_7$ −28.811 |  |  |  |

$(f/\Sigma DF) \cdot (L - L')/L = 1.72$

What is claimed is:

1. A front conversion lens system attachable only on an object side of an objective lens of a camera in which either of a real focal length photographing mode and a pseudo focal length photographing mode in which, an area, in an image recorded in a frame, smaller than a normal printing area printed when selecting the real focal length photographing mode is printed, is selectable, the lens system satisfying the following condition:

$$0.25 < (f/\Sigma DF)(L-L')/L < 7.0$$

wherein;
- f represents a focal length of a photographing lens system including the front conversion lens system and the objective lens;
- $\Sigma DF$ represents an axial thickness of the front conversion lens system;
- L represents a length of a diagonal line of an image plane to be printed when the real focal length photographing mode is selected; and
- L' represents a length of a diagonal line of an image plane to be printed when the pseudo focal length photographing mode is selected.

2. A front conversion lens system as claimed in claim 1, wherein the lens system includes from the object side at least one positive lens and at least one negative lens.

3. A front conversion lens system as claimed in claim 1, wherein the lens system includes, from the object side, a first positive meniscus lens element convex to the object side, and a second negative meniscus lens element convex to the object side.

4. A front conversion lens system attachable on an object side of an objective lens of a camera in which either of a real focal length photographing mode and a pseudo focal length photographing mode in which, an area, in an image recorded in a frame, smaller than a normal printing area printed when selecting the real focal length photographing mode is printed, is selectable, the lens system satisfying the following condition:

$$0.25 < (f/\Sigma DF)\cdot(L-L')/L < 7.0$$

wherein;
- f represents a focal length of a photographing lens system including the front conversion lens system and the objective lens;
- $\Sigma DF$ represents an axial thickness of the front conversion lens system;
- L represents a length of a diagonal line of an image plane to be printed when the real focal length photographing mode is selected;
- L' represents a length of a diagonal line of an image plane to be printed when the pseudo focal length photographing mode is selected;
- the lens system including, from the object side, a first positive meniscus lens element convex to the object side, and a second negative meniscus lens element convex to the object side; and
- the lens system comprising the following design parameters:

| Radius of curvature | Axial distance | Refractive index | Abbe number |
|---|---|---|---|
| $R_1$ 25.836 | $D_1$ 9.144 | $Nd_1$ .51680 | $vd_1$ 64.2 |
| $R_2$ 63.217 | $D_2$ 11.886 | | |
| $R_3$ 26.231 | | | |
| | $D_3$ 7.354 | $Nd_2$ 1.75690 | $vd_2$ 31.8 |
| $R_4$ 13.117 | | | |
| | $D_4$ 3.000 | | |

5. A front conversion lens system attachable on an object side of an objective lens of a camera in which either of a real focal length photographing mode and a pseudo focal length photographing mode in which, an area, in an image recorded in a frame, smaller than a normal printing area printed when selecting the real focal length photographing mode is printed, is selectable, the lens system satisfying the following condition:

$$0.25 < (f/\Sigma DF)\cdot(L-L')/L < 7.0$$

wherein;
- f represents a focal length of a photographing lens system including the front conversion lens system and the objective lens;
- $\Sigma DF$ represents an axial thickness of the front conversion lens system;
- L represents a length of a diagonal line of an image plane to be printed when the real focal length photographing mode is selected;
- L' represents a length of a diagonal line of an image plane to be printed when the pseudo focal length photographing mode is selected;
- the lens system including, from the object side, a first positive meniscus lens element convex to the object side, and a second negative meniscus lens element convex to the object side; and
- the lens system comprising the following design parameters:

| Radius of curvature | Axial distance | Refractive index | Abbe number |
|---|---|---|---|
| $R_1$ 26.119 | | | |
| | $D_1$ 9.757 | $Nd_1$ .51680 | $vd_1$ 64.2 |
| $R_2$ 109.689 | | | |
| | $D_2$ 12.572 | | |
| $R_3$ 24.001 | | | |
| | $D_3$ 8.254 | $Nd_2$ 1.75520 | $vd_2$ 27.5 |
| $R_4$ 10.264 | | | |
| | $D_4$ 3.000 | | |

6. A front conversion lens system attachable on an object side of an objective lens of a camera in which either of a real focal length photographing mode and a pseudo focal length photographing mode in which, an area, in an image recorded in a frame, smaller than a normal printing area printed when selecting the real focal length photographing mode is printed, is selectable, comprising side:
- a first positive meniscus lens element convex to the object side; and
- a second negative meniscus lens element convex to the object side.

7. A front conversion lens system attachable on an object side of an objective lens of a camera in which either of a real focal length photographing mode and a pseudo focal length photographing mode in which an area, in an image recorded in a frame, smaller than a normal printing area printed when selecting the real focal length photographing mode is printed, is selectable, said system comprising:
- a positive meniscus lens convex to the object side of the system; and
- a negative meniscus lens convex to the object side.

8. A front conversion lens system attachable on an object side of an objective lens of a camera in which either of a real focal length photographing mode and a pseudo focal length photographing mode in which an area, in an image recorded in a frame, smaller than a normal printing area printed when selecting the real focal length photographing mode is printed, is selectable, said system comprising:
- a positive meniscus lens convex to the object side of the system;
- a negative meniscus lens convex to the object side; and said objective lens comprising, sequentially:
- a first positive meniscus lens element convex to the object side;
- a second bi-concave lens element;
- a third negative lens element; and
- a fourth bi-convex lens element adhered to said third negative lens element.

* * * * *